March 22, 1960 E. G. HOYME ET AL 2,929,357
HOG CHUTE
Filed Dec. 11, 1957 2 Sheets-Sheet 1
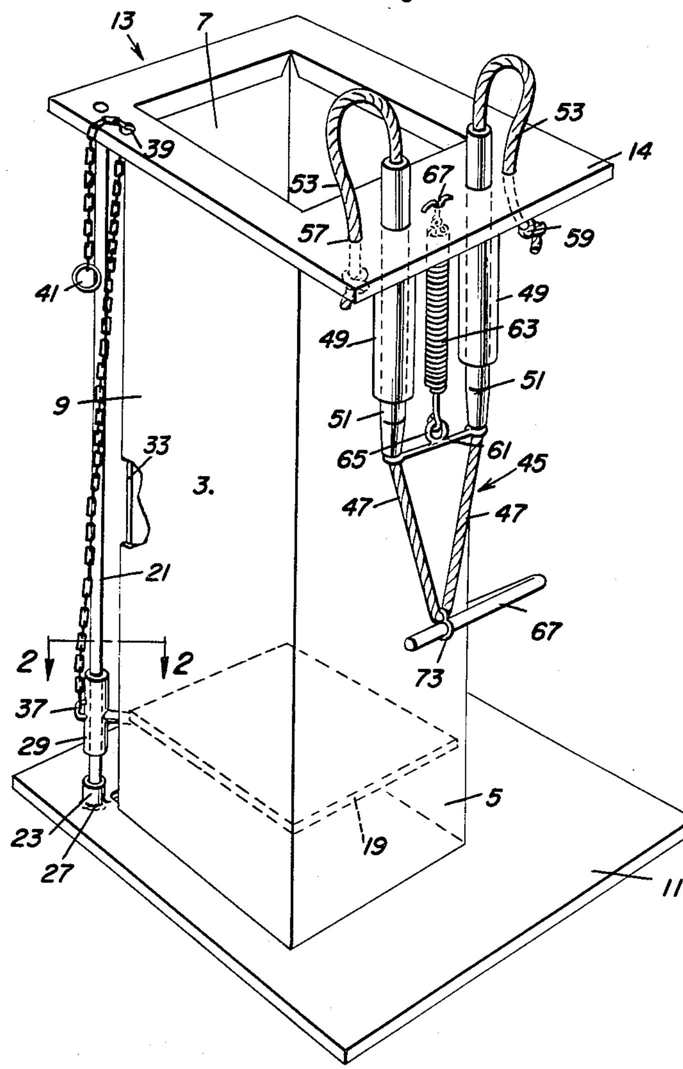
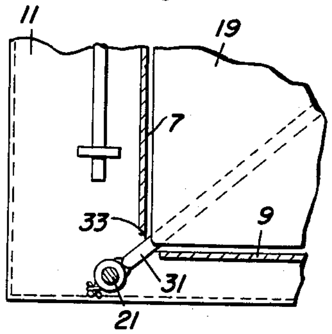
Ernest G. Hoyme
Clifford L. Hoyme
INVENTORS
BY Clarence A. O'Brien
and Harvey B. Jacobson
Attorneys HOG CHUTE
Filed Dec. 11, 1957
2 Sheets-Sheet 2
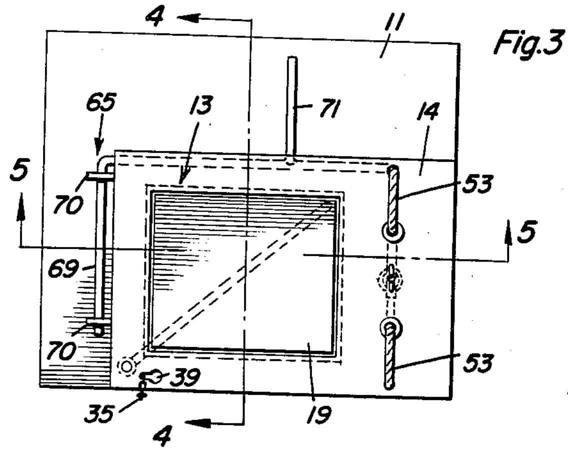
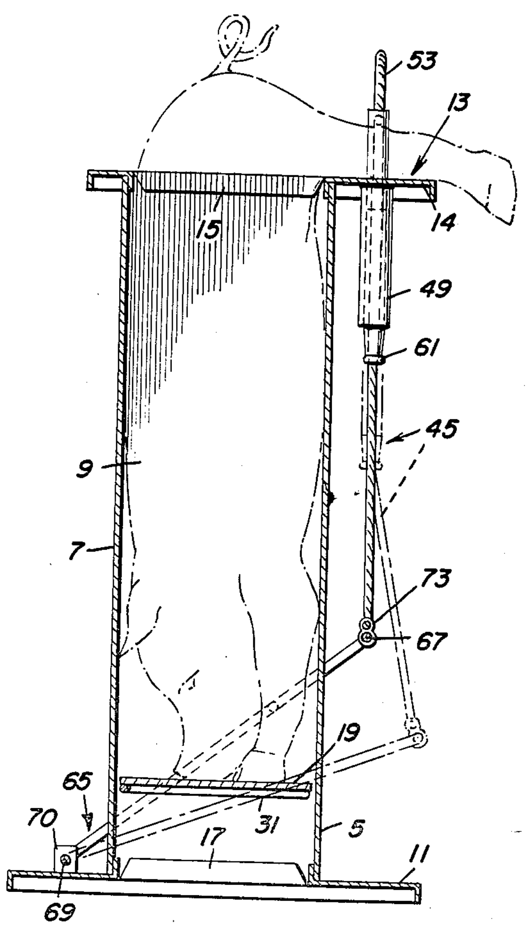
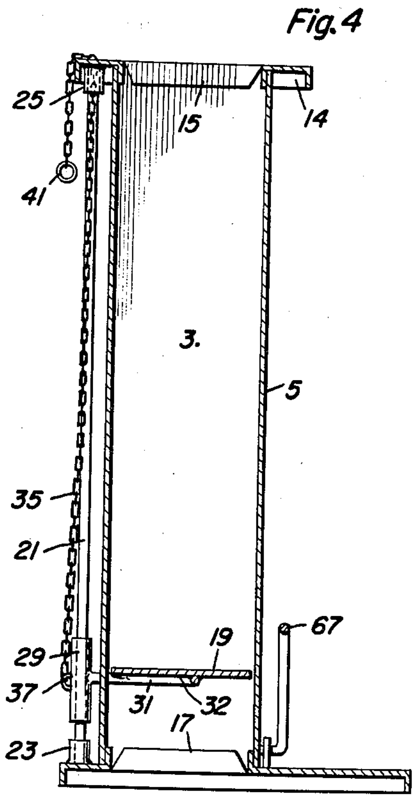
Ernest G. Hoyme
Clifford L. Hoyme
INVENTORS
BY Clarence A. O'Brien and Harvey B. Jacobson
Attorneys

United States Patent Office 2,929,357

Patented Mar. 22, 1960

2,929,357

HOG CHUTE

Ernest G. Hoyme and Clifford L. Hoyme, Camrose, Alberta, Canada

Application December 11, 1957, Serial No. 702,116

3 Claims. (Cl. 119—98)

Our invention relates to improvements in chutes for use in castrating hogs and branding the ears thereof.

The primary object of our invention is to provide an upright chute for restraining a hog in upright position either tail end or head end uppermost and projecting out of and above the chute according to whether it is to be castrated or branded together with a vertically adjustable means in the chute for supporting the hog in the chute so as to project out of the same in a position most convenient for castration or branding, and means on the chute for holding the fore or hind legs immovable according to which end of the hog projects out of the chute.

Another object is to provide a chute as in the foregoing which is safe to use, saves time and labor and is of simple inexpensive construction and substantially foolproof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of our improved chute;

Figure 2 is an enlarged fragmentary view in horizontal section taken on the line 2—2 of Figure 1;

Figure 3 is a top plan view on a smaller scale;

Figure 4 is a view in vertical section taken on the line 4—4 of Figure 3; and

Figure 5 is a view in vertical section taken on the line 5—5 of Figure 3.

Referring to the drawings by numerals, the chute of our invention comprises as its main component a vertically elongated casing 3 of rectangular cross section, preferably having front, rear and side walls 5, 7, 9 respectively, and which is supported on a relatively larger marginally flanged, rectangular base plate 11 and supports on its top a relatively larger rectangular marginally flanged crown plate 13 forming a ledge 14 around said top widest at the front of the casing, or chute, 3. The casing and the base and crown plates are preferably formed of heavy gage sheet metal. The casing 3 is open at its upper and lower ends and the base and crown plates 11, 13 are of open frame construction with flanges 15, 17 suitably secured in the open ends of the casing as by welding, not shown.

Means for supporting a hog in the casing 3 comprises a rectangular elevator platform 19 in the form of a metal plate vertically slidably adjustable in the casing 3 and which is mounted for vertical guided adjustment by the following means. A vertical guide rod 21 at one rear corner of the casing 3 and spaced outwardly thereof is fixed at its lower and upper ends between the plates 11, 13 in lower and upper sockets 23, 25 welded as at 27, to said plates. A guide sleeve 29 is vertically slidably fitted on the rod 21 and is supportably connected to the platform by a radial rod 31 on the sleeve 29 underlying the platform diagonally and welded as at 32 thereto.

The casing 3 is provided in the beforementioned corner with a vertical longitudinal guide slot 33 through which the rod 31 projects and is vertically guided to provide for vertical sliding of the sleeve 29 to adjust the platform 19.

A chain 35 for raising and lowering the platform 19 is attached at one end as at 37 to the sleeve 29 and extends upwardly through a slot 39 in the crown plate 13 and is provided at its upper end with a hand grip ring 41. The slot 39 is of keyhole shape so that the chain may be slid therethrough and locked in the smaller end of the slot 39 to hold the platform 19 in any desired raised or lowered position.

Pedal operated hold down means is provided on the front of the chute for clamping the hind legs or the fore legs of a hog on the ledge 14 at the front of the chute. This means comprises a flexible hold down shackle rope doubled midway of its ends to form a shackle loop 45, with sides 47 vertically slidably extended through a pair of vertical guide tubes 49 suitably fixed in the ledge 14 in laterally spaced relation at opposite sides of a transverse center of said ledge 14 from which the loop depends. Stiffener slide tubes 51 in which the sides 47 of the shackle loop 45 are suitably fixed are slidably fitted in said guide tubes. The ends 53 of the shackle loop 45 extend outwardly of the upper ends of the guide tubes 49 to overlie the ledge 14 and are fixed to the ledge 14 in spaced relation to the slide tubes 51 by passing said ends 53 through openings 57 in the ledge 14 and knotting said ends 53, as at 59, below said ledge. As will be seen by pulling the shackle loop 45 downwardly the ends 53 thereof may be tightened against a hog's pair of legs previously inserted between said ends and the ledge 14 and the legs may be clamped to the ledge 14 in spread apart relation while the slide tubes 51 are retracted downwardly into the upper ends of the guide tubes 49 in out of the way position all as shown in broken lines in Figure 5.

A transverse tie rod 61 connects the sides 47 of the shackle loop 45 below the guide tubes 49 and is suitably secured to the lower ends of the slide tubes 51 to equalize sliding of both sides 47 of the shackle loop 45. A coil spring 63 is terminally connected to the center portion of the rod 61 and to the ledge 14 as at 65, 67. The spring 63 urges the slide tubes 51 and the sides 47 of the shackle loop 45 upwardly to create slack in the ends 53 of said loop so that a hog's legs may be inserted under said ends.

A foot pedal 65 having a front and rear cross end 67, 69, straddles the casing 3 with its rear end 69 pivoted, as at 70, on the base plate 11 and its front end extending across the front of the casing 3. A lateral foot hold arm 71 on the rod 65 provides for depressing the same. A slide link 73 on the front end 67 through which the bight of the shackle loop 45 extends operatively connects the foot pedal 65 to said loop.

The operation of our invention will be readily understood. The spring 63 normally pulls the shackle loop 45 upwardly to create a slack in the ends 53 of said loop by projecting the slide tubes partway above the ledge 14. A hog to be castrated is deposited head down in the casing on the platform 19 with its nose and fore legs resting thereon and the platform 19 vertically adjusted by the chain 35 until the buttocks and hind legs of the hog project above the ledge 14 a sufficient distance for the operation and the hind legs are then inserted under the ends 53 of the shackle loop 45. The pedal 65 is then depressed, as shown in broken lines in Figure 5, to tighten the ends 53 and clamp the legs to the ledge 14 in the manner already described. In branding, the hog is inserted downwardly in the casing 3 with its buttocks and hind legs lowermost and resting on the platform 19 and the platform adjusted so that the head of the hog projects out of the casing and the fore legs may be clamped to the ledge 14 by operation of the pedal all in a manner which will be clear without further explanation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A chute for use in castrating a hog or branding its ears comprising a base, a hollow casing rising from said base with an open top for insertion of a hog downwardly therein with its head and fore legs or its buttocks and hind legs projecting above said top according to whether castration or branding is to be performed, a platform in said casing for supporting a hog therein, means vertically slidably mounting said platform for vertical adjustment to variably project a hog above said top, manual means for adjusting said platform, a lateral ledge on said casing at said top for supporting the legs projecting above said top, and manual means for clamping the legs to said ledge, said platform comprising a horizontal plate in said casing, said first named means comprising a vertical guide rod fixed to said base and ledge, and a sleeve vertically slidable on the guide rod and supportingly fixed to said plate.

2. A chute for use in castrating a hog or branding its ears comprising a base, a hollow casing rising from said base with an open top for insertion of a hog downwardly therein with its head and forelegs or its buttocks and hind legs projecting above said top according to whether castration or branding is to be performed, a platform in said casing for supporting a hog vertically adjustable to variably project a hog above said top, said casing having a vertical guide slot, a vertical rod on said base adjacent said slot, a member on said rod supportingly connected to said platform through said slot and vertically slidable on said rod to adjust said platform, a lateral ledge on said top of the casing for supporting the legs projecting above said top, a pair of shackle loops on said ledge operative to hold a hog's legs to said ledge, means on said ledge operatively connected to both loops for operating the loops simultaneously, manual means on said ledge operative to slide said member and a pedal on said base operatively connected to the means for operating the loops.

3. The combination of claim 2, said means for operating the loops comprising a pair of spring tensioned vertical slides connected together for operation in unison.

References Cited in the file of this patent

UNITED STATES PATENTS

| | | |
|---|---|---|
| 1,209,549 | Brown et al. | Dec. 19, 1916 |
| 1,398,484 | Holding | Nov. 29, 1921 |
| 2,279,012 | Packchanian | Apr. 7, 1942 |
| 2,460,857 | Sweat | Feb. 8, 1949 |
| 2,664,857 | Miller | Jan. 5, 1954 |
| 2,788,767 | Dooley | Apr. 16, 1957 |
| 2,811,974 | Garapolo et al. | Nov. 5, 1957 |